(12) United States Patent
Zhang

(10) Patent No.: US 11,050,755 B2
(45) Date of Patent: *Jun. 29, 2021

(54) PERMISSION MANAGEMENT AND RESOURCE CONTROL

(71) Applicant: Advanced New Technologies Co., Ltd., Grand Cayman (KY)

(72) Inventor: Xueling Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,819

(22) Filed: Dec. 18, 2019

(65) Prior Publication Data
US 2020/0128019 A1 Apr. 23, 2020

Related U.S. Application Data

(63) Continuation of application No. 16/026,861, filed on Jul. 3, 2018, which is a continuation of application No. PCT/CN2016/113442, filed on Dec. 30, 2016.

(30) Foreign Application Priority Data

Jan. 8, 2016 (CN) .......................... 201610011962.6

(51) Int. Cl.
*H04L 29/06* (2006.01)
*G06Q 30/02* (2012.01)
(Continued)

(52) U.S. Cl.
CPC ........... *H04L 63/102* (2013.01); *G06Q 20/10* (2013.01); *G06Q 20/227* (2013.01);
(Continued)

(58) Field of Classification Search
CPC .......... G06F 21/31; G06F 17/60; G06F 15/16; G06F 15/173; G06F 17/00;
(Continued)

(56) References Cited

U.S. PATENT DOCUMENTS 7,024,385 B1  4/2006 Adcock et al.
8,392,971 B1  3/2013 Kates et al.
(Continued)

FOREIGN PATENT DOCUMENTS

CN  101377864  3/2009
CN  101777164  7/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Abu S Sholeman
(74) *Attorney, Agent, or Firm* — Fish & Richardson P.C.

(57) ABSTRACT

A server receives an association request initiated by a user of a first account. Based on the association request, an account identifier of a second account is identified. The first account is associated with the second account based on the account identifier. In response to associating the first account with the second account, a partial permission is granted to the first account for accessing the second account.

12 Claims, 5 Drawing Sheets

(51) Int. Cl.
*G06Q 40/04* (2012.01)
*G06Q 20/40* (2012.01)
*G06Q 20/10* (2012.01)
*G06Q 20/38* (2012.01)
*G06Q 20/42* (2012.01)
*G06Q 20/22* (2012.01)

(52) U.S. Cl.
CPC ......... *G06Q 20/2295* (2020.05); *G06Q 20/38* (2013.01); *G06Q 20/40* (2013.01); *G06Q 20/405* (2013.01); *G06Q 20/42* (2013.01); *G06Q 30/0279* (2013.01); *G06Q 40/04* (2013.01); *H04L 29/06* (2013.01)

(58) Field of Classification Search
CPC ......... G06F 2221/2141; H04L 63/0884; H04L 63/0876; H04L 63/08; H04L 63/10; H04L 41/0803; H04L 67/42; H04L 67/303; H04L 67/1097; H04L 63/102; H04L 29/06; G06Q 20/382; G06Q 20/2295; G06Q 30/0279; G06Q 40/04; G06Q 20/40; G06Q 20/10; G06Q 20/38; G06Q 20/405; G06Q 20/42; G06Q 20/227
See application file for complete search history.

(56) References Cited

U.S. PATENT DOCUMENTS

| | | | | |
|---|---|---|---|---|
| 8,561,894 | B1* | 10/2013 | Mullen | G07F 17/42 235/381 |
| 10,143,916 | B1 | 12/2018 | Hawk et al. | |
| 10,749,875 | B2 | 8/2020 | Vincent | |
| 2002/0049806 | A1* | 4/2002 | Gatz | G06F 21/62 709/203 |
| 2003/0233557 | A1 | 12/2003 | Zimmerman | |
| 2004/0122769 | A1* | 6/2004 | Bailo | G06Q 20/102 705/42 |
| 2005/0021455 | A1* | 1/2005 | Webster | G06Q 20/24 705/39 |
| 2005/0086126 | A1* | 4/2005 | Patterson | A63F 13/792 705/26.8 |
| 2008/0067240 | A1* | 3/2008 | Nakano | G06Q 20/341 235/380 |
| 2009/0144192 | A1* | 6/2009 | Zhu | G06Q 10/10 705/39 |
| 2010/0114685 | A1 | 5/2010 | Blass | |
| 2010/0125864 | A1 | 5/2010 | Dwyer et al. | |
| 2010/0257030 | A1 | 10/2010 | Crocker | |
| 2010/0318411 | A1 | 12/2010 | Pink et al. | |
| 2011/0113487 | A1 | 5/2011 | Miller | |
| 2013/0185412 | A1* | 7/2013 | Orr | H04L 63/08 709/224 |
| 2013/0325394 | A1 | 12/2013 | Yuen et al. | |
| 2014/0324988 | A1* | 10/2014 | Zhang | H04L 51/043 709/206 |
| 2015/0073959 | A1 | 3/2015 | Connors et al. | |
| 2015/0143475 | A1* | 5/2015 | Song | H04L 63/08 726/4 |
| 2015/0161614 | A1 | 6/2015 | Tsing | |
| 2015/0206201 | A1 | 7/2015 | Worth | |
| 2015/0269668 | A1 | 9/2015 | Gil et al. | |
| 2015/0286836 | A1 | 10/2015 | Menn | |
| 2016/0203213 | A1* | 7/2016 | Lewis | G06F 16/951 707/737 |
| 2016/0330146 | A1 | 11/2016 | Yoo et al. | |
| 2018/0332046 | A1* | 11/2018 | Zhang | G06Q 20/2295 |
| 2020/0007554 | A1 | 1/2020 | Vincent | |
| 2020/0193540 | A1* | 6/2020 | Crumb | G06Q 20/405 |

FOREIGN PATENT DOCUMENTS

| | | |
|---|---|---|
| CN | 103312701 | 9/2013 |
| CN | 103686387 | 3/2014 |
| CN | 104281796 | 1/2015 |
| CN | 104618509 | 5/2015 |
| CN | 104700197 | 6/2015 |
| CN | 104954330 | 9/2015 |
| CN | 104954506 | 9/2015 |
| CN | 105119886 | 12/2015 |
| CN | 105227321 | 1/2016 |
| JP | 2010521741 | 6/2010 |
| KR | 100864995 | 10/2008 |
| KR | 101219027 | 1/2013 |
| TW | 200836085 | 9/2008 |
| TW | 201541980 | 11/2015 |
| WO | WO2012029796 | 3/2012 |

OTHER PUBLICATIONS

European Extended Search Report in European Patent Application No. 16883463.8, dated Jul. 9, 2019, 9 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/113442, dated Jul. 10, 2018, 8 pages (with English translaiton).
PCT International Search Report in International Application No. PCT/CN2016/113442, dated Apr. 6, 2017, 9 pages.
PCT Written Opinion of the International Searching Authority in International Application No. PCT/CN2016/113442, dated Apr. 6, 2017, 7 pages (with English translation).

* cited by examiner

PERMISSION MANAGEMENT AND RESOURCE CONTROL

This application is a continuation of U.S. patent application Ser. No. 16/026,861, filed on Jul. 3, 2018, which is a continuation of PCT Application No. PCT/CN2016/113442, filed on Dec. 30, 2016, which claims priority to Chinese Patent Application No. 201610011962.6, filed on Jan. 8, 2016, and each application is hereby incorporated by reference in its entirety.

TECHNICAL FIELD

The present application relates to the field of computer technologies, and in particular, to a permission management and resource control method and apparatus.

BACKGROUND

With the continuous advancement of society, a growing number of organizations disclose resources for social supervision, for example, discloses the fund raised.

Currently, when the charity raises fund, it usually needs to open a bank account. A donor can then transfer donation from a bank account that the donor opened to the charity account.

In existing technologies, after receiving a fund transfer request sent by the donor that includes the transfer amount, a server directly withdraws a corresponding amount from the donor's account, and transfers the withdrawn amount to the charity account. The charity can subsequently disclose the fund raised.

However, because only an account holder is allowed to access and use the resource (such as the charity fund) in the account (for example, only the charity is allowed to access and use funds in the charity account), if a resource in an account needs to be disclosed, the account holder needs to disclose the resource in the account in other manners. Because the general public does not have direct access to the charity account, the disclosed resource may not be trusted (for example, the general public may challenge the amount and usage of the donation disclosed by the charity). Therefore, how to allow other users to have certain access rights to a specific user account can be a problem to be solved.

SUMMARY

Implementations of the present application provide a permission management and resource control method and apparatus, to resolve the following problems with the existing technology: other users cannot access and control a specific account.

An implementation of the present application provides a permission management method. The method includes: receiving, by a server, a request sent by a user for associating a first account with a second account; associating the first account with the second account; and granting partial permission on the second account to the first account.

An implementation of the present application provides a resource control method. The method includes: receiving, by a server, a request sent by a first account for operating a second account, where the operation request includes operation type information; determining whether the first account is associated with the second account; and if yes, determining whether permission granted by the second account to the first account includes permission corresponding to the operation type information, and if yes, performing an operation corresponding to the operation type information, or otherwise, refusing to perform an operation corresponding to the operation type information; otherwise, refusing to perform an operation corresponding to the operation type information.

An implementation of the present application provides a permission management apparatus. The apparatus includes: a receiving module, configured to receive a request sent by a user for associating a first account with a second account; an association module, configured to associate the first account with the second account; and a permission granting module, configured to grant partial permission on the second account to the first account.

An implementation of the present application provides a resource control apparatus. The apparatus includes: a receiving module, configured to receive a request sent by a first account for operating a second account, where the operation request includes operation type information; a determining module, configured to determine whether the first account is associated with the second account; and an execution module, configured to: when a determining result of the determining module is yes, determine whether permission granted by the second account to the first account includes permission corresponding to the operation type information; and if yes, perform an operation corresponding to the operation type information, or otherwise, refuse to perform an operation corresponding to the operation type information; or when a determining result of the determining module is no, refuse to perform an operation corresponding to the operation type information.

The implementations of the present application provide the permission management and resource control method and apparatus. In the method, the server receives the request sent by the user for associating the first account with the second account, associates the first account with the second account, and grants partial permission on the second account to the first account. In the method, if the partial permission on the second account is the permission to check resource information corresponding to the second account, the user can identify, by using the first account, a status of the resource corresponding to the second account. As such, the resource information disclosed can be trusted because the user can gain partial access and control of the second account.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF IMPLEMENTATIONS

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

Figure 1:
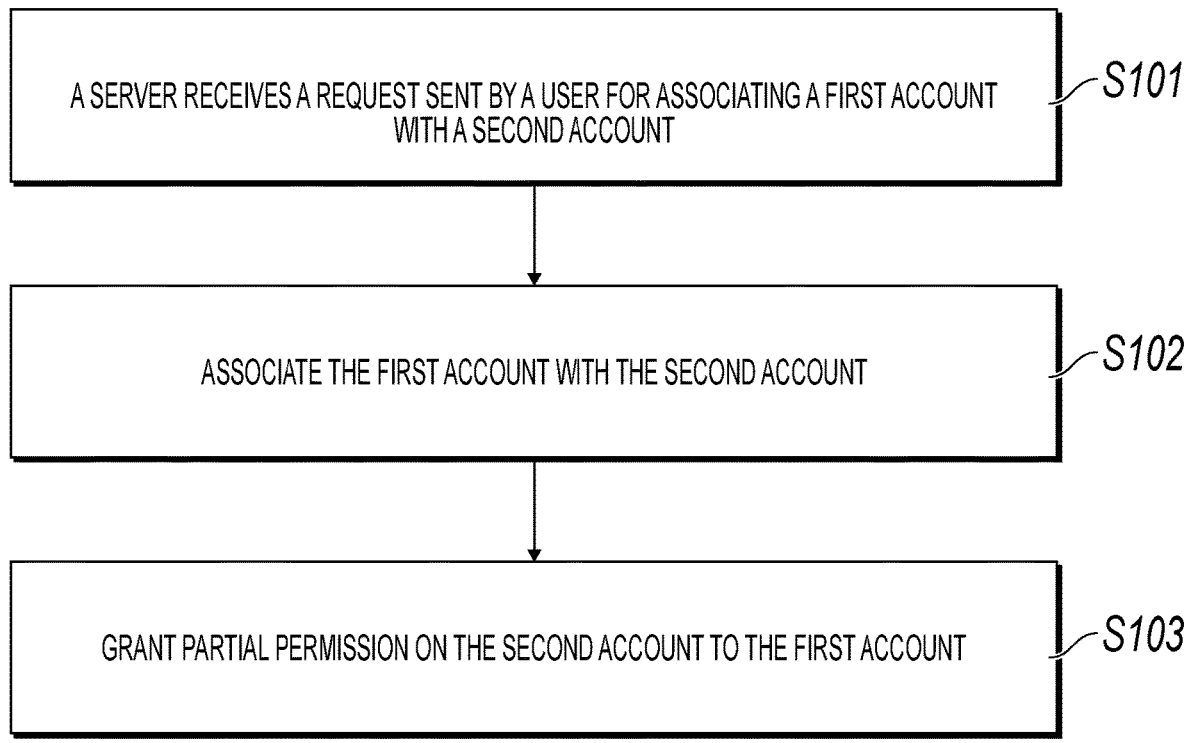
FIG. 1 illustrates a permission management process according to an implementation of the present application.

FIG. 1 illustrates a permission management process according to an implementation of the present application. The permission management process includes the steps below.

S101: A server receives a request sent by a user for associating a first account with a second account.

In existing applications, a user can access and control its own account, and can access and control accounts of other users only when the user logs in to their accounts. However, allowing logging in to other users' account can cause security problems.

In order for a user to gain partial access and control of another user's account with low security risk, the user can send a request for associating the first account with the second account to a server. The first account is the account of the user who sends the association request (that is, an account that is opened by the user who sends the association request). The second account is an account that the user needs to gain partial access and control. The association request may be a subscription request or a friend request. In addition, the association request includes an account identifier of the first account and an account identifier of the second account.

For example, assuming that user A needs to obtain permission to check a charity donation amount in an account of a charity to identify a donation amount accepted by the charity, user A can send a subscription request for associating an account (that is, the first account) of user A with the account (that is, the second account) of the charity. The subscription request includes an identifier of user A's account and an identifier of the charity account.

S102: Associate the first account with the second account.

In this implementation of the present application, after receiving the association request sent by the user for associating the first account with the second account, the server can directly associate the first account with the second account based on the identifier of the first account and the identifier of the second account that are included in the association request.

It should be noted that, in the present application, a plurality of first accounts may be associated with one second account, and one first account may be associated with a plurality of second accounts.

Continuing with the previous example, after receiving the subscription request sent by user A for associating user A's account with the charity account, the server associates user A's account with the charity account based on the identifier of user A's account and the identifier of the charity account.

S103: Grant partial permission on the second account to the first account.

In this implementation of the present application, after associating the first account with the second account, the server can grant partial permission to the first account for accessing the second account, so that the user can subsequently perform operations allowed by the partial permission on the second account from the first account. The partial permission can be predetermined by a user that opens the second account.

In the present application, the above-mentioned partial permission may include at least one of the following types:

Type 1: permission to check resource information corresponding to the second account.

Type 2: permission to transfer a resource to the second account.

Type 3: permission to vote on an operation to be performed by the second account.

Certainly, the permissions are not limited to the previous three types, and may further include other permissions. The user of the second account can preset the permissions based on actual implementations. Details are omitted here.

Continuing with the previous example, assuming that permission predetermined by the charity is the permission to check a charity donation amount of a charity account, after associating user A's account with the charity account, the server can grant the charity donation amount check permission to the account of user A, so that user A can subsequently check the charity donation amount in the charity account by using user A's account.

It should be noted that, for the third type of permission, the server can subsequently allow or reject the operation to be performed by the second account based on voting results of first accounts associated with the second account. That is, if the server receives an operation request from the second account for transferring money to another account, the server can initiate a voting operation by the first accounts associated with the second account, so that the first accounts can vote on the transfer operation. Subsequently, the server can collect voting results of the first accounts, and allow or reject the transfer operation to be performed by the second account based on the voting results of the first accounts. Certainly, before performing an operation, the second account can actively initiate voting to the first accounts through the server, so that the first accounts can vote on the operation.

In some cases, if the partial permission on the second account is the permission to check resource information corresponding to the second account, the user can identify, by using the first account, a status of the resource corresponding to the second account. As such, the resource information disclosed can be trusted because the user can gain partial access and control of the second account.

In some implementations, a user can obtain partial permission to the second account by sending an association request for associating the first account with the second account to the server. Then an operation can be performed to the second account as allowed by the partial permission. However, the second account's account information may leak.

In the present application, accounts fall into two types: private accounts and public accounts. Any account can be associated with a public account, and a public account can be associated with another public account. No account can be associated with a private account, but a private account can be associated with any public account. After receiving the association request sent by a user for associating the first account with the second account, the server can determine, based on the identifier of the second account included in the association request, whether the second account is a public account. If yes, the server associates the first account with the second account; otherwise, the server notifies the user that association fails.

Figure 2:
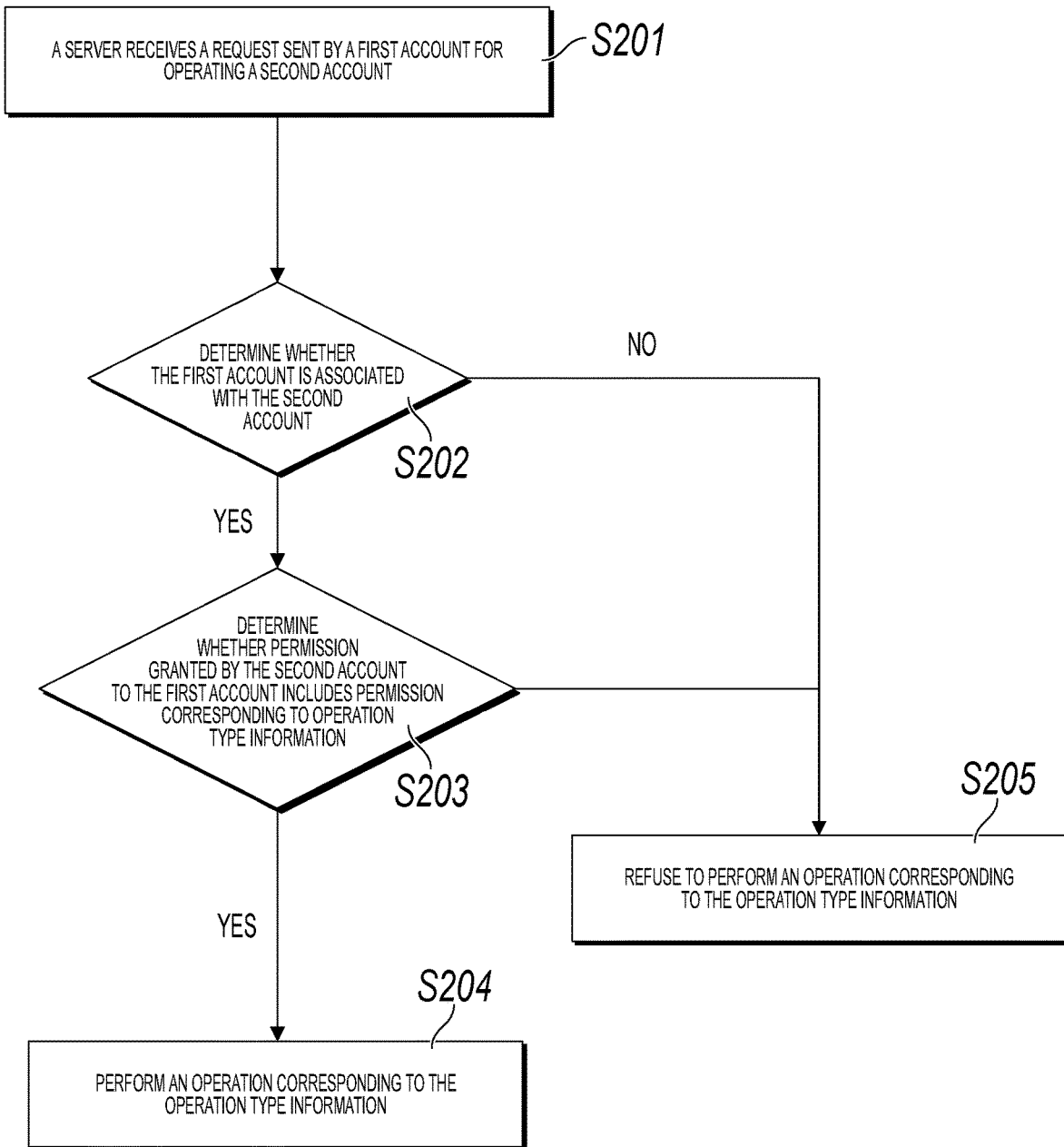
FIG. 2 illustrates a resource control process according to an implementation of the present application.

A permission management method provided in the present application is described above. As shown in FIG. 2, after the server associates the first account with the second account, the first account can perform operations allowed by the partial permission on the second account.

FIG. 2 illustrates a resource control process according to an implementation of the present application. The resource control process includes the steps below.

S201: A server receives a request sent by a first account for operating a second account.

In the present application, when a user needs to perform an operation on the second account by using the first account, the server first receives the request sent by the first account. The operation request includes operation type information. The operation type information records an operation that the user needs to perform on the second account. In addition, the operation request includes an identifier of the first account and an identifier of the second account. The identifier of the first account and the identifier of the second account are used to determine whether the first account sending the operation request is associated with the second account.

Continuing with the previous example, assuming that user A needs to check the charity donation amount in the charity account, the server receives a request sent by user A's account for operating the charity account. The operation request includes a charity donation amount check type (that is, the operation type information), the identifier of user A, and the identifier of the charity account.

S202: Determine whether the first account is associated with the second account; and if yes, perform step S203; otherwise, perform step S205.

In the present application, only an account associated with the second account can have partial operation permission granted by the second account. Therefore, after receiving the request sent by the first account for operating the second account, the server can first determine whether the first account is associated with the second account; and if yes, perform step S203; otherwise, perform step S205.

Continuing with the previous example, the server determines, based on the identifier of user A and the identifier of the charity account that are included in the operation request, the account that sends the operation request has been associated with the charity account, and performs S203.

S203: Determine whether permission granted by the second account to the first account includes permission corresponding to operation type information. If yes, perform step S204; otherwise, perform step S205.

S204: Perform an operation corresponding to the operation type information.

In some implementations, an operation that the first account performs on the second account may not be included in the partial permission granted by the second account. Therefore, in the present application, after determining that the first account is associated with the second account, the server can continue to determine whether the permission granted by the second account to the first account includes the permission corresponding to the operation type information. If yes, perform the operation corresponding to the operation type information; otherwise, refuse to perform the operation corresponding to the operation type information, and send an operation failure message to the first account to notify the user that the operation corresponding to the operation type information cannot be performed on the second account.

Continuing with the previous example, the server determines, based on pre-stored permissions granted to user A, whether checking the charity donation amount is permitted. If checking charity donation amount is a type of permitted operations, the charity donation amount can be provided to user A.

S205: Refuse to perform an operation corresponding to the operation type information.

Based on the above method, if the partial permission granted by the second account to the first account is the permission to check resource information corresponding to the second account, the user can identify, by using the first account, a status of the resource corresponding to the second account. As such, the resource information disclosed can be trusted because the user can gain partial access and control of the second account.

The operation type included in the operation request sent by the first account may be resource checking, or other, operation type. For example, In some implementations, the user may transfer a resource to the second account by using the first account. Therefore, in the present application, the second account can grant, to the first account associated with the second account, permission to transfer a resource to the second account. In other words, the user can transfer a corresponding resource to the second account by using the first account. When the operation type included in the request is a resource transfer type, and it further includes a resource amount to be transferred, the server can withdraw, from the first account, the corresponding amount of resources, and add them to the second account.

For example, assuming that permission granted by the charity account to user A's account is the permission to transfer a resource to a charity account, the server receives a request sent by user A's account for operating the charity account. The operation request includes an operation type, which is charity donation transfer, the identifier of user A's account, and 100 RMB (a charity donation amount to be transferred). The server determines that the account that sends the operation request has been associated with the charity account, and the charity donation transfer included in the operation request is a permitted operation type. Therefore, the server can withdraw 100 RMB from user A's account, and add it to the charity account.

In the present application, to enhance interactions between accounts, in the present application, the server can determine a total number of resources transferred from the first account to the second account, and set a corresponding resource transfer label identifying the total number of transferred resources from the first account. Before providing account information of the first account to the user, the server can add the resource transfer label to the account information of the first account.

Continuing with the previous example, assuming that user A transferred 200 RMB from her account (i.e., the first account) to the charity account, and then transfers 100 RMB from her account to the charity account, the server learns, through calculation, that a total amount transferred from user A's account to the charity account is 300 RMB, and then changes the transfer label identifying 200 RMB to the transfer label identifying 300 RMB in user A's account. Subsequently, before providing account information of the first account to user A and another user, the server can add the transfer label identifying 300 RMB to the account information of user A.

Specifically, in the present application, the following method can be used: Number intervals are obtained through division, and one corresponding resource transfer label is set for each interval. Each time the user transfers, by using the first account, a resource to the second account associated with the first account, the total number of resources transferred from the first account to the second account needs to be determined. A resource transfer label corresponding to a number interval that the total number of transferred resources falls within is set for the first account based on the number interval.

In addition, in order for the user to use the one or more first accounts to strengthen control on the second account associated with the first accounts, in the present application, after receiving an operation request sent by the second account, the server can initiate voting on first accounts associated with the second account. The first accounts can vote to determine whether the operation can be performed by using the second account. Specifically, the server receives a voting request from a first account for voting on an operation to be performed by the second account. In other words, operation type information included in the voting request is voting, and the votes are cast based on the vote types included in the voting request (the vote types can include "voting for" and "voting against"). When a predetermined condition is satisfied, the server collects voting results of the first accounts associated with the second account, and allows or rejects the operation to be performed by the second account based on the voting results. The predetermined condition may be that the number of first accounts that have participated in the voting is greater than a threshold, or may be that a predetermined voting deadline has expired.

For example, assuming that permission granted by the charity account to user A's account is the permission to vote on an operation to be performed by the charity account, the server receives a request from user A's account for voting on a transfer operation to be performed by the charity account. The server determines that the account that sends the operation request has been associated with the charity account, and determines that rights associated with vote types (that is, the operation type information) included in the operation request is one of the granted rights. Therefore, the server votes on the transfer operation to be performed by the charity account based on a vote type (assuming that the vote type is "voting for") included in the voting request. It is assumed that a condition predetermined by the charity is: if more than five first accounts participated in the voting and the "voting for" votes exceed 50% of the total votes, the second account is allowed to transfer money to another account. Under this condition, if server identifies, through statistics collection, that the number of voters is 7 and the number of "voting for" votes is 6, the server then allows money to be transferred to the charity account.

Finally, it should be noted that the above-mentioned resource may be a physical resource, virtual currency, etc. Details are omitted here.

A permission management method and a resource control method that are provided in the implementations of the present application are described above. Based on the same concept, the implementations of the present application provide two apparatuses, that is, a permission management apparatus shown in FIG. 3 and a resource control apparatus shown in FIG. 4.

Figure 3:
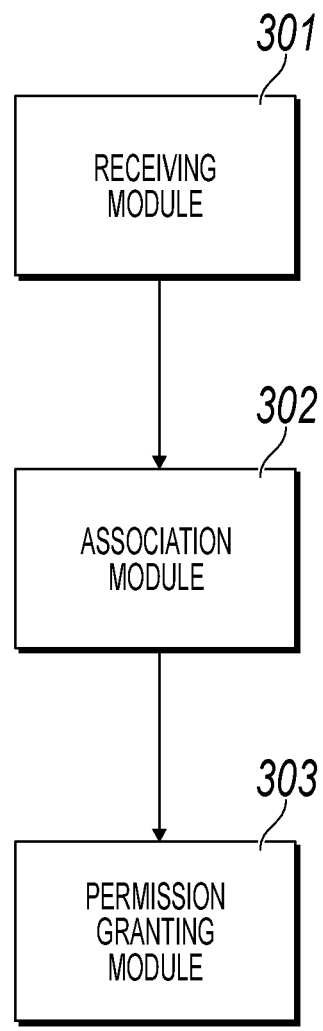
FIG. 3 is a schematic structural diagram illustrating a permission management apparatus according to an implementation of the present application.

FIG. 3 is a schematic structural diagram illustrating a permission management apparatus according to an implementation of the present application. The apparatus includes: a receiving module 301, configured to receive a request sent by a user for associating a first account with a second account; an association module 302, configured to associate the first account with the second account; and a permission granting module 303, configured to grant partial permission on the second account to the first account.

The partial permission includes at least one of permission to check resource information corresponding to the second account, permission to transfer a resource to the second account, and permission to vote on an operation to be performed by the second account. The server allows or rejects the operation to be performed by the second account based on voting results of first accounts associated with the second account.

Figure 4:
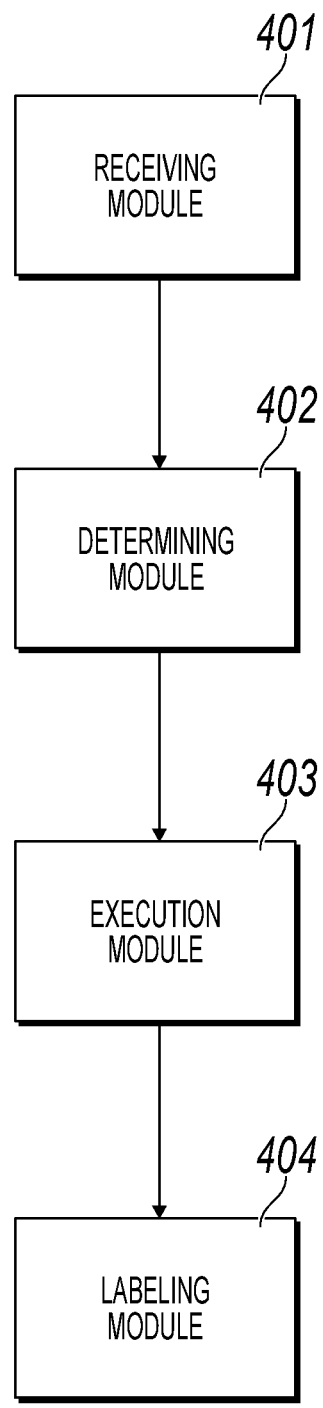
FIG. 4 is a schematic structural diagram illustrating a resource control apparatus according to an implementation of the present application.

FIG. 4 is a schematic structural diagram illustrating a resource control apparatus according to an implementation of the present application. The apparatus includes: a receiving module 401, configured to receive a request sent by a first account for operating a second account, where the operation request includes operation type information; a determining module 402, configured to determine whether the first account is associated with the second account; and an execution module 403, configured to: when a determining result of the determining module 402 is yes, determine whether permission granted by the second account to the first account includes permission corresponding to the operation type information; and if yes, perform an operation corresponding to the operation type information, or otherwise, refuse to perform an operation corresponding to the operation type information; or when a determining result of the determining module 402 is no, refuse to perform an operation corresponding to the operation type information.

The operation type information includes a resource information check type; and the execution module 403 is specifically configured to: obtain resource information corresponding to the second account, and provide the obtained resource information to the first account.

The operation type information includes a resource transfer type, and the operation request further includes a number of resources to be transferred; and the execution module 403 is specifically configured to withdraw, from the first account, resources corresponding to the resource number, and add them to the second account.

The apparatus further includes: a labeling module 404, configured to: determine a total number of resources transferred from the first account to the second account; set a corresponding resource transfer label for the first account based on the total resource number; and before providing account information of the first account to a user, add the resource transfer label to the account information of the first account.

The operation request includes a request for the first account to vote on an operation to be performed by the second account. The operation type information includes a voting type. The execution module 403 is specifically configured to: vote on the operation to be performed by the second account based on a voting type included in the operation request, and when a predetermined condition is satisfied, collect voting results of first accounts associated with the second account, and allow or reject the operation to be performed by the second account based on the voting results.

The resource includes an amount.

In a typical configuration, a computing device includes one or more processors (CPUs), an input/output interface, a network interface, and a memory.

The memory can include a non-persistent memory, a random access memory (RAM), a non-volatile memory, and/or another form that are/is in a computer readable medium, for example, a read-only memory (ROM) or a flash memory (flash RAM). The memory is an example of the computer readable medium.

The computer readable media include persistent, non-persistent, movable, and unmovable media that can store information by using any method or technology. The information can be a computer readable instruction, a data structure, a program module, or other data. Examples of a computer storage medium include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape/magnetic disk storage or another magnetic storage device or any other non-transitory medium that can be used to store information accessible by the computing device. Based on a definition in this specification, the computer readable medium does not include computer-readable transitory media (transitory media) such as a modulated data signal and a carrier.

It should be further noted that the term "include", "contain", or any other variant thereof is intended to cover a non-exclusive inclusion, so that a process, a method, a commodity, or a device that includes a series of elements not only includes those elements but also includes other elements that are not expressly listed, or further includes elements inherent to such process, method, commodity, or device. An element preceded by "includes a . . . " does not, without more constraints, preclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The previous implementations are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims of the present application.

Figure 5:
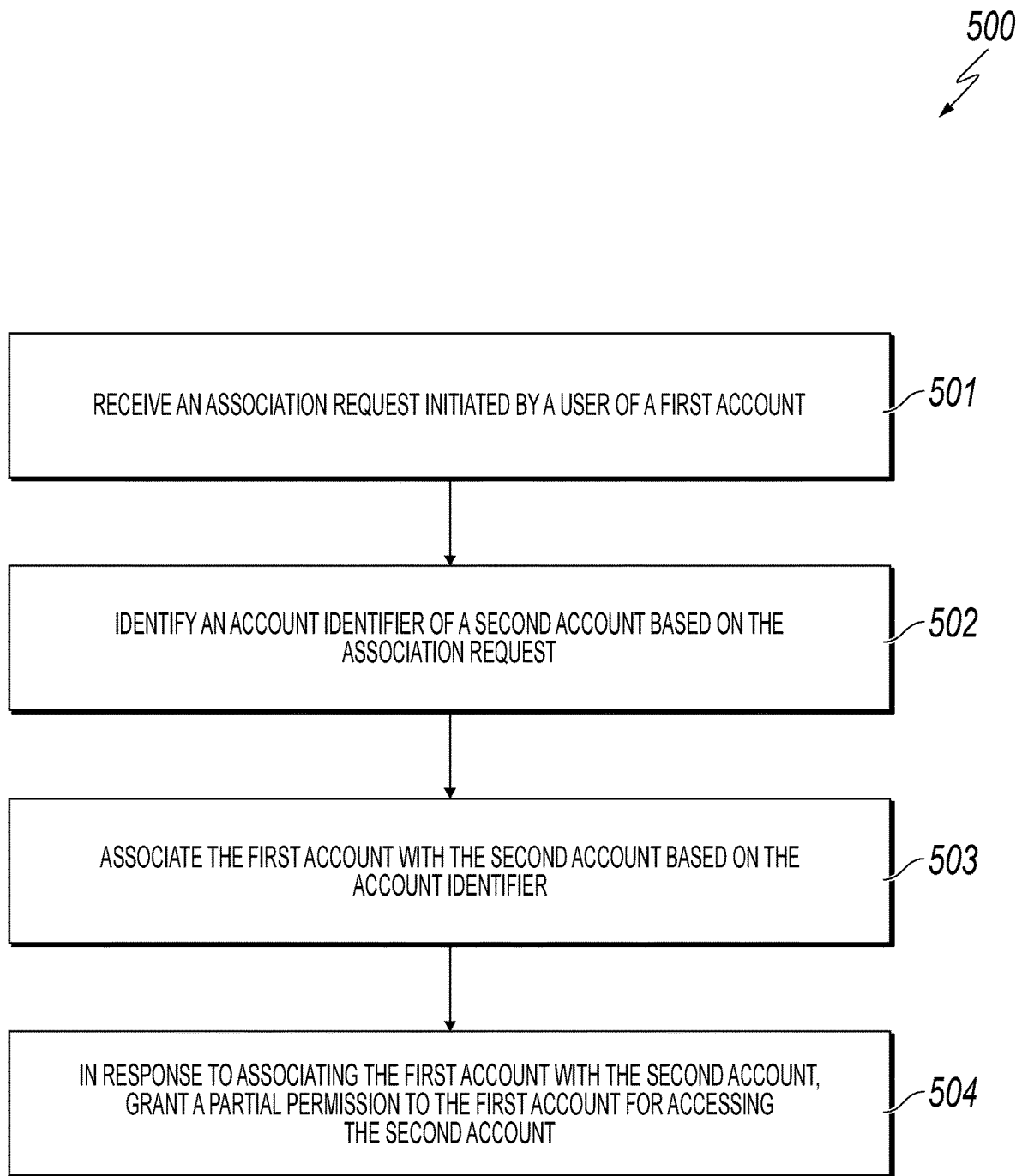
FIG. 5 is a flowchart illustrating an example of a computer-implemented method for associating a first account with a second account, according to an implementation of the present disclosure.

FIG. 5 is a flowchart illustrating an example of a computer-implemented method 500 for associating a first account with a second account, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 501, a server receives an association request initiated by a user of a first account. From 501, method 500 proceeds to 502.

At 502, an account identifier of a second account corresponding to the association request is identified. The association request can be a subscription request or a friend request from an account to the second account. Further, the association request includes, but not limited to, the account identifier for the first account and the account identifier for the second account. In some implementations, the first account can be a private account and the second account can be a public account. In other implementations, the first account can be a public account and the second account is a private account. Further, in some implementations, the first account and the second account can both be a public or a private account. From 502, method 500 proceeds to 503.

At 503, the first account is associated with the second account based on the account identifier. In some implementations, the first account can be associated with a plurality of second accounts. Likewise, in some implementations, the second account can be associated with a plurality of first accounts. From 503, method 500 proceeds to 504.

At 504, in response to associating the first account with the second account, a partial permission is granted to the first account for accessing the second account. In some implementations, the partial permission includes, but is not limited to, at least one of the following permissions: 1) to query resource information corresponding to the second account; 2) to transfer a resource to the second account; and 3) to vote on an operation to be performed by the second account.

After the partial permission is granted to the first account for accessing the second account, the server can receive an operation request from the first account to interact with the second account. At least one of the partial permissions to the first account for accessing the second account corresponds to the operation request is determined. After determining the granted permission, an operation corresponding to the operation request is performed. In some implementations, the operation request includes, but is not limited to, operation type information. The operation type information can be a resource information query operation, a resource transfer request operation, and a voting operation. In some implementations, determining at least one of the permissions granted to the first account includes determining whether the permission corresponds to the operation type information. After 504, method 500 stops.

Implementations of the subject matter described in this specification can be implemented so as to realize particular advantages or technical effects. For example, implementations of the subject matter permit enhancement to data access between accounts (for example, by increasing security, accuracy, transmission speed, or transmission efficiency). An account association can be initiated by a user with a request containing account identifier information for a second account to be associated with a first account. In some implementations, the user initiates an association request from a computing device, and the association request is sent to a server (for example, a backend server) for processing. The server receives the association request initiated by a user of the first account for accessing the second account. After the server associates the first account with the second account, the server grants partial permissions to the first account for accessing the second account. In some implementations, the request is transmitted, using a network protocol, by a networking device to the server. In some implementations, the server can include, but is not limited to, physical, virtual, or a combination of physical and virtual servers (for example, a cloud service, workstation, mobile computing device, and hardware or software computing devices).

The described methodology permits enhancement of various computing device transactions and overall transactions between accounts. Participants in account transactions can be confident with accuracy and security of account information and performed transactions associated with the account information. The enhancement of account functionalities can provide seamless, secure interactions between associated accounts. The described methodology also permits permission management and resource control. Resource status corresponding to the second account can be determined by using the first account. Disclosed resource information can be considered trusted because a user of the first account can gain partial access and control of the second account. The disclosed resource information can be used by the user of the first account to control resources corresponding to the second account.

In some implementations, one or more particular elements of a graphical user interface associated with the described methodology can be grouped, positioned, or arranged to be unobtrusive for a user. For example, the one or more elements can be positioned in such a way so as to obscure the least amount of data possible and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server, an association request initiated by a user of a private first account to associate the private first account with a second account;
   identifying an account identifier of the second account based on the association request;
   determining, by the server based upon the account identifier of the second account, that the second account is a public account accessible by other accounts;
   in response to determining that the second account is a public account, associating the private first account with the second account based on the account identifier;
   in response to associating the private first account with the second account, granting a partial permission to the private first account for accessing the second account;
   receiving, by the server from the private first account, an operation request from the first account for the private first account to interact with the second account, the operation request comprises operation type information;
   determining that the operation request corresponds to the partial permission granted to the private first account for accessing the second account and that the partial permission corresponds to the operation type information; and
   performing, by the private first account via the server, an operation corresponding to the operation request to interact with the second account based upon the partial permission granted to the private first account for accessing the second account.

2. The computer-implemented method according to claim 1, wherein the partial permission comprises at least one of:
   permission to query resource information corresponding to the second account; and
   permission to transfer a resource to the second account.

3. The computer-implemented method of claim 1, comprising:
   associating the private first account with a plurality of second accounts; or
   associating the second account with a plurality of private first accounts.

4. The computer-implemented method of claim 2, comprising:
   wherein the private first account is interacting with the second account when the operation request is received.

5. A non-transitory, computer-readable medium storing one or more instructions executable by a computer system to perform operations comprising:
   receiving, by a server, an association request initiated by a user of a private first account to associate the private first account with a second account;
   identifying an account identifier of the second account based on the association request;
   determining, by the server based upon the account identifier of the second account, that the second account is a public account accessible by other accounts;
   in response to determining that the second account is a public account, associating the private first account with the second account based on the account identifier;
   in response to associating the private first account with the second account, granting a partial permission to the private first account for accessing the second account;
   receiving, by the server from the private first account, an operation request from the first account for the private first account to interact with the second account, the operation request comprises operation type information;
   determining that the operation request corresponds to the partial permission granted to the private first account for accessing the second account and that the partial permission corresponds to the operation type information; and
   performing, by the private first account via the server, an operation corresponding to the operation request to interact with the second account based upon the partial permission granted to the private first account for accessing the second account.

6. The non-transitory, computer-readable medium of claim 5, wherein the partial permission comprises at least one of:
   permission to query resource information corresponding to the second account; and
   permission to transfer a resource to the second account.

7. The non-transitory, computer-readable medium of claim 5, comprising:
associating the private first account with a plurality of second accounts; or
associating the second account with a plurality of private first accounts.

8. The non-transitory, computer-readable medium of claim 6, comprising:
wherein the private first account is interacting with the second account when the operation request is received.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server, an association request initiated by a user of a private first account to associate the private first account with a second account;
identifying an account identifier of the second account based on the association request;
determining, by the server based upon the account identifier of the second account, that the second account is a public account accessible by other accounts;
in response to determining that the second account is a public account, associating the private first account with the second account based on the account identifier;
in response to associating the private first account with the second account, granting a partial permission to the private first account for accessing the second account;
receiving, by the server from the private first account, an operation request from the first account for the private first account to interact with the second account, the operation request comprises operation type information;
determining that the operation request corresponds to the partial permission granted to the private first account for accessing the second account and that the partial permission corresponds to the operation type information; and
performing, by the private first account via the server, an operation corresponding to the operation request to interact with the second account based upon the partial permission granted to the private first account for accessing the second account.

10. The computer-implemented system of claim 9, wherein the partial permission comprises at least one of:
permission to query resource information corresponding to the second account; and
permission to transfer a resource to the second account.

11. The computer-implemented system of claim 9, comprising:
associating the private first account with a plurality of second accounts; or
associating the second account with a plurality of private first accounts.

12. The computer-implemented system of claim 10, comprising:
wherein the private first account is interacting with the second account when the operation request is received.

* * * * *